United States Patent [19]

Kanamori

[11] Patent Number: 5,675,440
[45] Date of Patent: Oct. 7, 1997

[54] PHOTOGRAPHIC LENS

[75] Inventor: Tatsuru Kanamori, Hanno, Japan

[73] Assignee: Olympus Optical Co., Ltd., Tokyo, Japan

[21] Appl. No.: 420,785

[22] Filed: Apr. 12, 1995

[30] Foreign Application Priority Data

Apr. 12, 1994 [JP] Japan .................................. 6-073479

[51] Int. Cl.$^6$ .......................... G02B 15/14; G02B 3/02; G02B 7/02
[52] U.S. Cl. .................... 359/686; 359/689; 359/692; 359/715; 359/717; 359/820
[58] Field of Search ............................ 359/715, 753, 359/660, 661, 820, 677, 686, 687, 689, 692

[56] References Cited

U.S. PATENT DOCUMENTS

| | | | |
|---|---|---|---|
| 4,666,257 | 5/1987 | Tanaka et al. | 359/686 |
| 5,251,069 | 10/1993 | Iizuka | 359/717 |
| 5,278,699 | 1/1994 | Ito et al. | 359/692 |
| 5,412,510 | 5/1995 | Iizuka et al. | 359/820 |
| 5,424,871 | 6/1995 | Ito et al. | 359/689 |

FOREIGN PATENT DOCUMENTS

| | | |
|---|---|---|
| 3-181908 | 8/1991 | Japan . |
| 4178608 | 6/1992 | Japan . |
| 5164963 | 6/1993 | Japan . |

Primary Examiner—Georgia Y. Epps
Assistant Examiner—Evelyn A. Lester
Attorney, Agent, or Firm—Cushman, Darby & Cushman IP Group of Pillsbury Madison & Sutro LLP

[57] ABSTRACT

The invention provides a photographic lens which uses a low-hygroscopicity resin lens component as a constitutional component, is made compact without incurring some expense, and enables the optical properties to be kept stable to an atmospheric humidity change. The photographic lens is of the single-focus or varifocallength type that comprises a plurality of lens components among which at least one or more lens components are resin lens components, wherein at least one of the resin lens components is formed of a low-hygroscopicity resin. For instance, the invention is applicable to a single-focus lens comprising four lens components, i.e., a positive meniscus lens component convex on the object side, a double-concave lens component, a double-convex lens component and a negative meniscus lens component convex on the image surface side. If a polyolefin type resin that is a low-hygroscopicity resin is used for the fourth lens component of this single-focus lens, it is then possible to obtain a single-focus lens which is of small size, inexpensive and stable in optical properties to an atmospheric humidity change.

12 Claims, 11 Drawing Sheets

FIG. 7
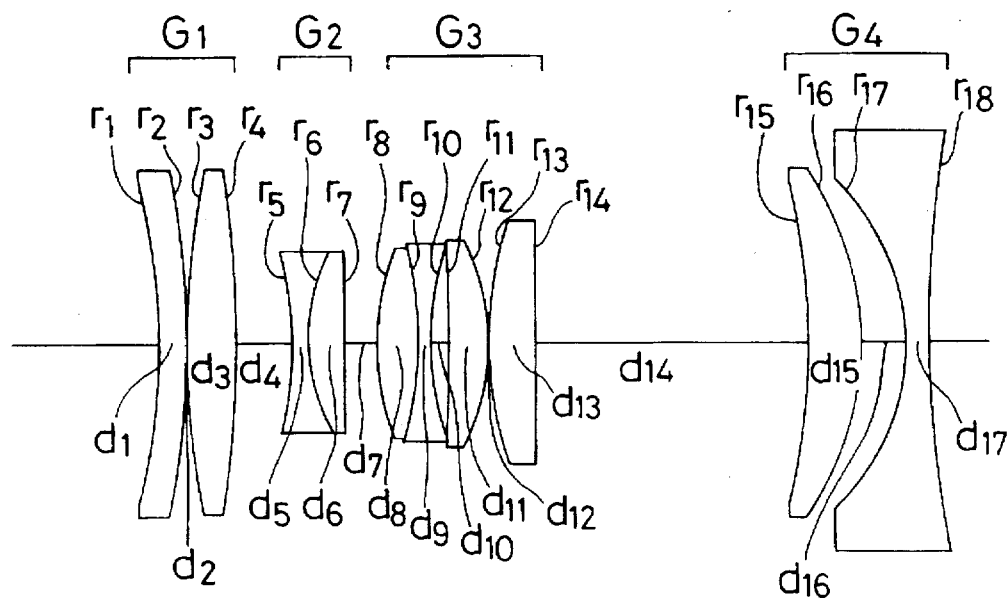
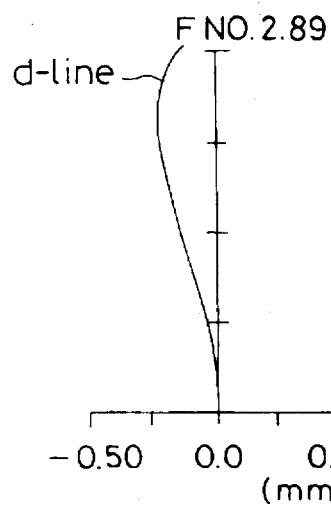
FIG. 8(a)
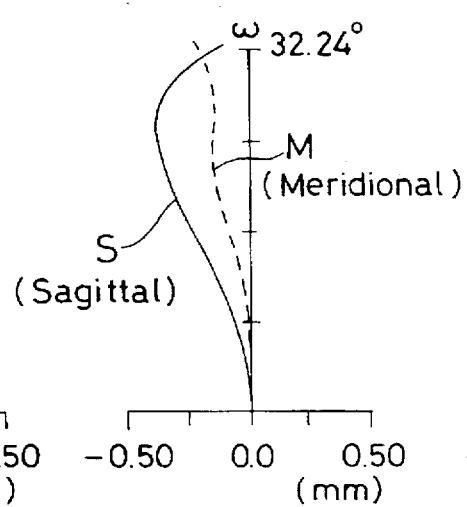
FIG. 8(b)
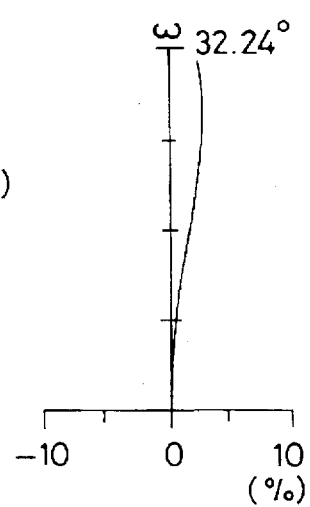
FIG. 8(c)

F NO. 4.64
−0.50  0.0  0.50
(mm)

ω 28.84°
−0.50  0.0  0.50
(mm)

ω 28.84°
−10  0  10
(%)

F NO. 5.55
−0.50  0.0  0.50
(mm)

ω 21.48°
−0.50  0.0  0.50
(mm)

ω 21.48°
−10  0  10
(%)

F NO. 6.62
−0.50  0.0  0.50
(mm)

ω 15.71°
−0.50  0.0  0.50
(mm)

ω 15.71°
−10  0  10
(%)

FIG. 24(a) F NO. 4.66
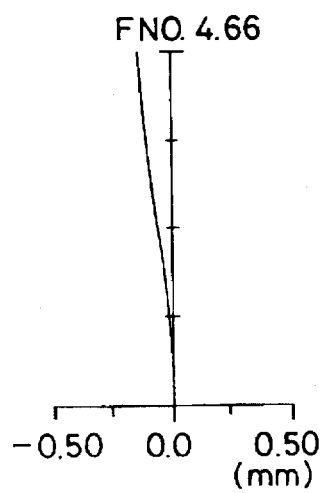
FIG. 24(b) ω 29.07°
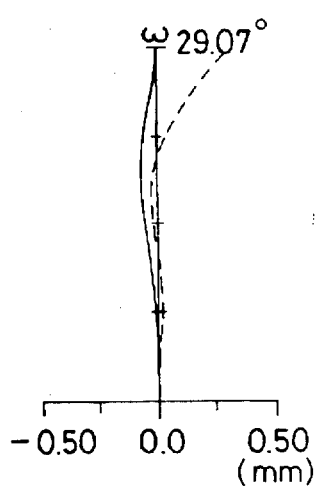
FIG. 24(c) ω 29.07°
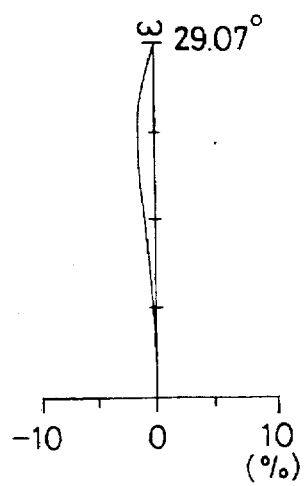
FIG. 25(a) F NO. 6.15
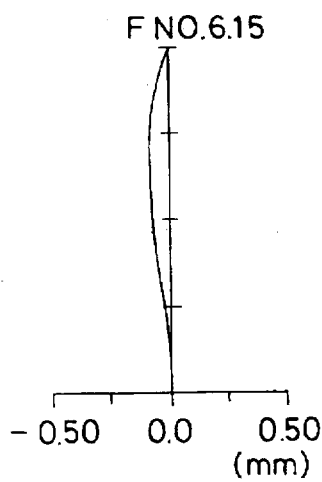
FIG. 25(b) ω 16.29°
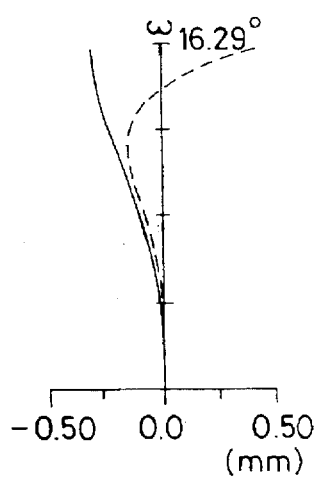
FIG. 25(c) ω 16.29°
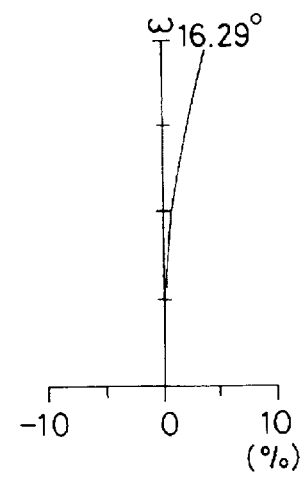
FIG. 26(a) F NO. 8.25
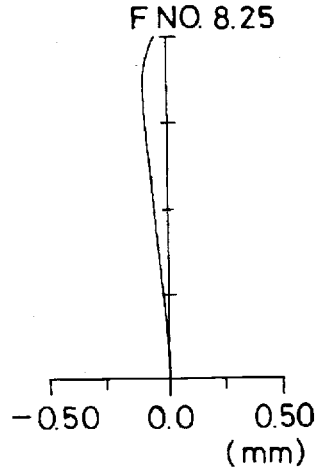
FIG. 26(b) ω 8.46°
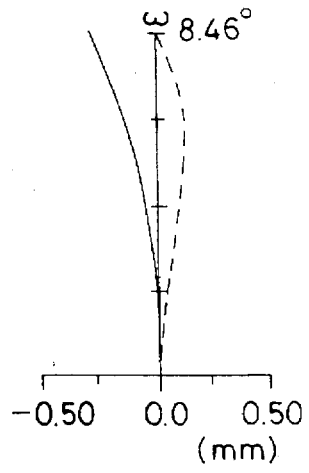
FIG. 26(c) ω 8.46°
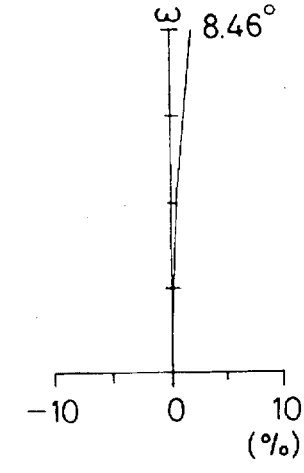

PHOTOGRAPHIC LENS

BACKGROUND OF THE INVENTION

1. Field of the Invention

This invention relates to a photographic lens, and more particularly to a photographic lens for cameras which is stable to humidity, compact and inexpensive.

2. Background of Related Art

For photographic lenses for cameras now required to be compact and inexpensive, resin lenses have often been used, as disclosed in JP-A 5(1993)-164963 and JP-A 4(1992)-178608. As is well known in the art, however, resin lenses are unstable to temperature and humidity changes, and a humidity change in particular causes them to vary in terms of their index of refraction and size due to the absorption and desorption of atmospheric moisture, so giving rise to changes in their optical properties such as those in image-formation position and image-formation performance. It is also known that the resin lenses are relatively quickly stabilized to a temperature change, but a much longer time is needed for their stabilization due to a humidity change. JP-A 5-164963 and JP-A 4-178608 make no definite mention of the use of resin lenses; however, the optical properties exemplified there appear to teach that resin lenses were used.

One way of dealing with such problems is known from JP-A 3(1991)-181908 which discloses that a resin lens component is housed in a lens housing while a lid is put on the outermost lens component in contact with the atmosphere which is formed of an inorganic material (which appears to have been an optical glass in light of the optical properties referred to in the publication above mentioned, although it merely states that a non-hygroscopic material is used), thereby isolating the interior of the lens housing from the air and so allowing the optical properties to be kept constant irrespective of atmospheric humidity changes.

Another possible approach is that a sensor is used to detect an atmospheric humidity change, so that the optical properties can be kept constant by means of a compensation mechanism positioned inside or outside the optical system.

Still another possible approach is that the refracting power of a resin lens is decreased so that the rate of contribution of the resin lens to the optical properties can be reduced, thereby keeping the optical properties constant.

For the approach disclosed in JP-A 3-181908, it is required to use an optical part as the lid, resulting in an inevitable increase in the number of the parts involved. In addition, the air pump effect of a zoom lens must be averted. To this end, two optical parts used as lids are always needed for each movable unit, incurring an additional increase in the number of the parts involved and so making it impossible to achieve reductions in camera size and cost.

In recent years, resin has often been used for a lens frame material for weight savings. When resin is used for the frame member, however, the resin lens becomes unstable because of the permeation of humidity through the frame member, thus failing to maintain the optical properties. This occurs even when the resin lens is lidded with inorganic material in front and in rear.

When a sensor is used to detect an atmospheric humidity change to maintain the optical properties of the resin lens by a compensation mechanism located inside or outside the optical system, it is actually impossible to maintain the optical properties, because no humidity compensation mechanism for making up for the problem mentioned above from outside the photographic optical system can be constructed due to the unavailability of any compact, simple humidity sensor that can be built in a camera.

In the approach in which the refracting power of the resin lens component is decreased so that the rate of its contribution to the optical properties of the photographic lens can be reduced to keep them constant, too, there is a problem; that is, no size and cost reductions of the photographic lens can be achieved. The reason is that since the refracting power of the resin lens component makes no contribution to the overall refracting power of the photographic lens, the desired refracting power is imparted to the photographic lens by making the number of the lens components larger than would be in the case of providing a suitable refracting power to the resin lens component.

As already mentioned, stabilization after a humidity change takes much time. In other words, it appears that the index of refraction of a resin lens varies, or is not uniform in distribution, between the central area and the vicinity of the surface area in the transition state through which the resin lens is stabilized to the humidity change. With a resin lens component, therefore, it is impossible to maintain the optical properties of a photographic lens in the transition state through which the resin lens component is stabilized due to humidity change.

When the outermost lens component of a photographic lens that is exposed to the air is formed of a resin lens component, as disclosed in JP-A 5-164963, there is an unavoidable change in the optical properties of the photographic lens due to an atmospheric humidity change.

It is found that resin lens component can be applied to a zoom lens system in which the final lens unit is of negative refracting power such as is disclosed in JP-A 4-178608. The general reason is that the final lens unit serves to aggravate errors occurring through a lens unit or units located in front thereof; that is, when resin lens components are conventionally used for the lens units in front of the final lens unit, a change due to a humidity change in the optical properties of the resin lens components is exacerbated by the final lens unit. Consequently, the change in the optical properties due to a humidity change becomes too large for maintaining the optical properties of the zoom lens system.

SUMMARY OF THE INVENTION

The present invention has been made in view of such problems associated with the prior art, and has for its object the provision of a photographic lens including a resin lens component or components of low hygroscopicity, which costs less, is of compact size, and is so stable to an atmospheric humidity change that the optical properties can be well maintained.

The object as mentioned above is accomplished by the photographic lens having the following characteristic features.

(1) A photographic single-focus lens comprising a plurality of lens components, among which at least one or more lens components are resin lens components, characterized in that at least one of the resin lens components is formed of a low-hygroscopicity resin.

(2) The photographic lens according to the above-mentioned (1), characterized in that the low-hygroscopicity resin lens component is located on the side proximate to either the object or the image surface.

(3) The photographic lens according to the above-mentioned (1), characterized in that inorganic glass lens components are located on both sides of the low-hygroscopicity resin lens component.

(4) The photographic lens according to the above-mentioned (1), characterized in that the low-hygroscopicity resin lens component is formed of a methyl polymethacrylate type of low-hygroscopicity acrylic resin.

(5) The photographic lens according to the above-mentioned (1), characterized in that the low-hygroscopicity resin lens component is formed of a polyolefin type resin.

(6) A varifocallength photographic lens system comprising a plurality of lens units in which the separation between at least adjacent lens units is varied for zooming, characterized by including at least one or more resin lens components, among which at least one lens component is formed of a low-hygroscopicity resin.

(7) The photographic lens system according to the above-mentioned (6), characterized by comprising, in order from the object side, a first positive lens unit and a second negative lens unit.

(8) The photographic lens system according to the above-mentioned (6), characterized by comprising, in order from the object side, a first positive lens unit, a second positive lens unit and a third negative lens unit.

(9) The photographic lens system according to the above-mentioned (6), characterized by comprising, in order from the object side, a first positive lens unit, a second negative lens unit, a third positive lens unit and a fourth negative lens unit.

(10) The photographic lens system according to any one of the above-mentioned (7) to (9), characterized in that the low-hygroscopity resin lens component is located in the unit or units arranged in front of the final negative lens unit.

(11) The photographic lens system according to any one of the above-mentioned (7) to (9), characterized in that the low-hygroscopicity resin lens component is formed of a methyl polymethacrylate type of low-hygroscopcitiy acrylic resin.

(12) The photographic lens system according to any one of the above-mentioned (7) to (9), characterized in that the low-hygroscopicity resin lens is formed of a polyolefin type resin.

The term "low-hygroscopicity resin" used herein is understood to refer to either a conventional resin for lenses with a large part of the polar groups contained in it being substituted by non-polar groups or a resin having no polar group. More specifically, it is understood to mean a resin with the maximum rate of dimensional change due to moisture absorption being up to 0.3% under conditions of a temperature of 60° C. and a humidity of 95% RH.

Reference will now be made to why the above-mentioned lens arrangements are used and how they work.

By complying with the above-mentioned feature (1) it is possible to achieve a photographic single-focus lens, which is less expensive, smaller, and more stable in optical properties to a humidity change than a conventional photographic single-focus lens, which makes use of a resin lens component or components.

By complying with the above-mentioned feature (2) it is possible to achieve a photographic single-focus lens, which is inexpensive, compact, and stable in optical properties to an atmospheric humidity change even when the low-hygroscopicity resin lens component is located on the outermost side of the lens arrangement which is particularly susceptible to a humidity change.

By complying with the above-mentioned feature (3) it is possible to use a low-hygroscopicity resin lens component for designing a photographic single-focus lens, which is inexpensive, small, and stable in optical properties to an atmospheric humidity change. This is true of even a resinous lens frame-containing lens system in which, even when inorganic glass lens components are disposed on both sides of a resin lens component to eliminate an influence of humidity change on the lens portion, much difficulty is involved in maintaining airtightness because of the permeation of humidity through the lens frame member or because of insufficient adhesion between the lens frame and the lens.

By complying with the above-mentioned feature (4) it is possible to achieve a photographic single-focus lens which is the same in cost as, and smaller and much more stable in optical performance to an atmospheric humidity change than, would be possible with the use of a conventional methyl polymethacrylate type of acrylic resin lens (which is found to show a maximum rate of dimensional change of at least 0.35% due to moisture absorption under generally applied conditions).

By complying with the above-mentioned feature (5) it is possible to achieve a photographic single-focus lens which is the same in cost as, and smaller and more unlikely to change in optical properties depending on an atmospheric humidity change than, would be possible with the use of a conventional resin lens, because the polyolefin type resin in particular can be very reduced in the maximum rate of dimensional change under the conditions as mentioned previously.

By complying with the above-mentioned feature (6) it is possible to achieve a varifocallength lens system (zoom lens system) which is comparable in cost to, and smaller and more stable in optical properties to an atmospheric humidity change than, a conventional varifocallength lens making use of resin lens components.

By complying with the above-mentioned feature (7) it is possible to achieve a varifocallength lens system which is comparable in cost to, and smaller and more stable in optical properties to an atmospheric humidity change than, a conventional photographic varifocallength lens system which comprises a first positive lens unit and a second negative lens unit and in which resin lens components are used.

By complying with the above-mentioned feature (8) it is possible to achieve a varifocallength lens system which is comparable in cost to, and smaller and more stable in optical properties to an atmospheric humidity change than, a conventional photographic varifocallength lens system which comprises a first positive lens unit, a second positive lens unit and a third negative lens unit and in which resin lens components are used.

By complying with the above-mentioned feature (9) it is possible to design a photographic varifocallength lens system which makes use of a resin lens or lenses and comprises a first positive lens unit, a second negative lens unit, a third positive lens unit and a fourth negative lens unit, and which is inexpensive, small, and stable in optical properties to an atmospheric humidity change.

By complying with the above-mentioned feature (10) it is possible to design a photographic varifocallength lens system which eliminates a change in its optical properties for the reason that the final lens unit aggravates a change in the optical properties of the lens unit or units located in front of the final lens unit due to a change of the resin lens component due to humidity, and which is inexpensive, small, and stable in optical properties to an atmospheric humidity change.

By complying with the above-mentioned feature (11) it is possible to design a photographic varifocallength lens system which is comparable in cost to, and smaller and much more stable in optical properties to an atmospheric humidity change than, the above-mentioned conventional one making use of a methyl polymethacrylate type of acrylic resin.

By complying with the above-mentioned feature (12) it is possible to design a photographic varifocallength lens system which is the same in cost as, and smaller and more invariable in optical properties to an atmospheric humidity change that, would be the case of using a conventional resin lens component, because the rate of the maximum dimensional change of the polyolefin type resin is particularly reduced under the above-mentioned conditions.

According to the present invention, since such a low-hygroscopicity resin as mentioned above is used for a resin lens, it is possible to achieve a photographic lens (system) having stable optical properties by reducing the quantity of atmospheric moisture absorbed or desorbed by the resin. With a photographic lens (system) having such features, it is unnecessary to incorporate a part serving as a lid in the photographic lens (system), as typically disclosed in JP-A 3-181908, thus making camera size and cost reductions possible. Further, any sensor for detecting atmospheric humidity changes or any mechanism for compensating humidity can be dispensed with, again making camera size and cost reductions possible. Furthermore, stable optical properties are ensured even in a transition state of humidity change, because the inside index of refraction of the resin lens component is kept uniform.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7 is a sectional view at the wide-angle end of the zoom lens system according to Example 7, FIGS. 8(a) to 8(c) are aberration diagrams showing the spherical aberration in FIG. 8(a), astigmatism in FIG. 8(b) and distortion in FIG. 8(c) of Example 1.

DESCRIPTION OF THE PREFERRED EMBODIMENTS

Examples 1 to 7 of the photographic lens system of the invention will now be explained with reference to FIGS. 1 to 7. Numerical data about each example will also be enumerated later.

Figure 1:
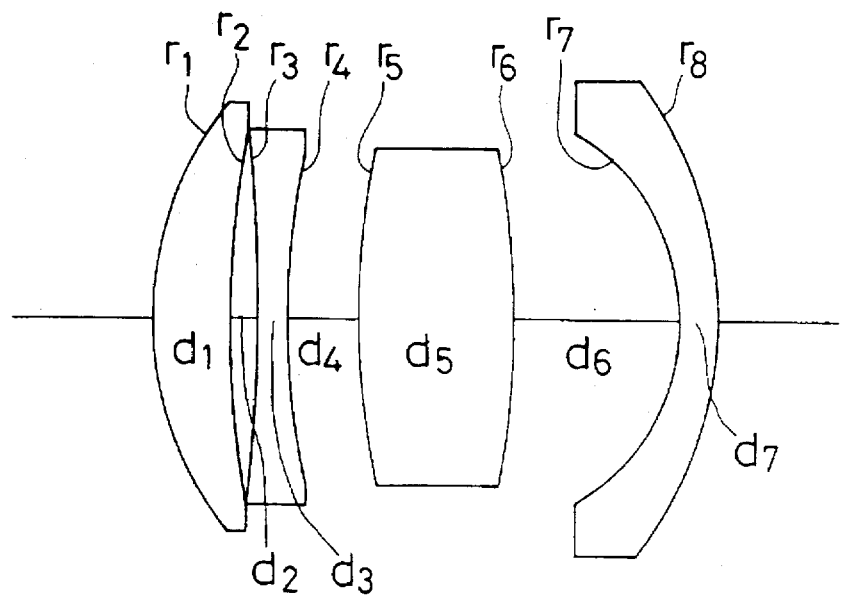
FIG. 1 is a sectional view of the single-focus lens according to Example 1.

In Example 1 the invention is applied to a single-focus lens having a focal length of 34 mm and an F-number of 2.89, a sectional view of which is attached hereto as FIG. 1. The lens arrangement consists of, in order from the object side, a positive meniscus lens component convex on the object side, a double-concave lens component, a double-convex lens component and a negative meniscus lens component convex on the image side, four in all, with an aspheric surface being used for the image side of the fourth lens component. The fourth lens component is then made up of a polyolefin type resin that has low hygroscopicity.

Figure 2:
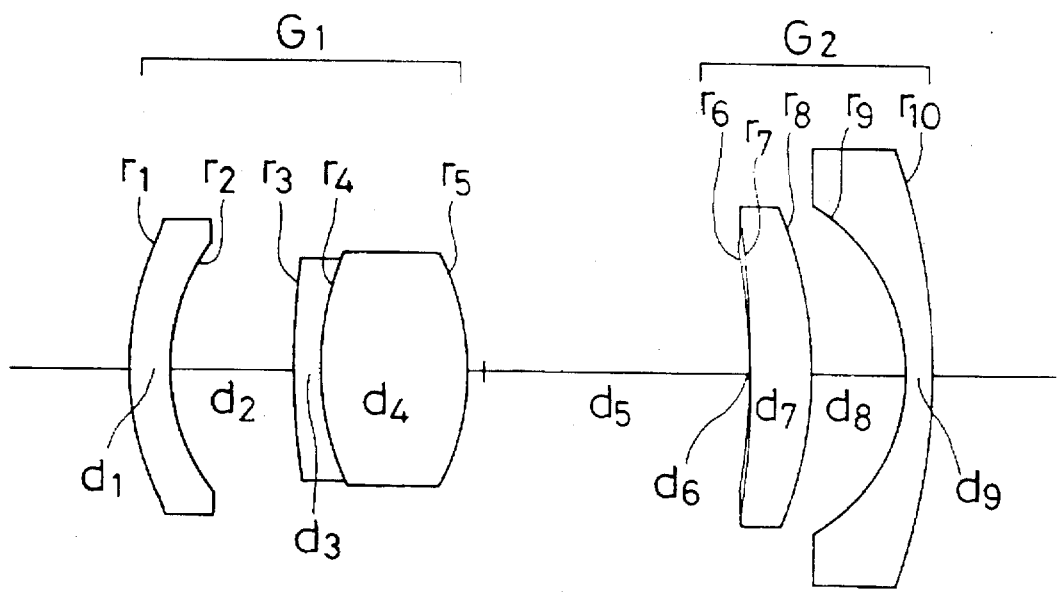
FIG. 2 is a sectional view at the wide-angle end of the zoom lens system according to Example 2.

In Example 2 the invention is applied to a zoom lens system having a focal length of 39 mm to 101 mm and an F-number of 4.66 to 9.21. A sectional view of the zoom lens system at the wide-angle end is shown in FIG. 2. The lens arrangement consists of a first positive lens unit $G_1$ and a second negative lens unit $G_2$ in order from the object side. The first lens unit $G_1$ consists of a negative meniscus lens convex on the object side and a cemented doublet of a negative meniscus lens convex on the object side and a double-convex lens, three in all, while the second lens unit $G_2$ consists of a positive meniscus lens convex on the image side, which is provided on the object-side spherical surface with a thin resin layer on which an aspheric surface is to be formed, and a negative meniscus lens convex on the image side, three in all (one of which is the thin resin layer). The first negative lens of the first lens unit $G_1$ is formed of a polyolefin type resin of low hygroscopicity, with an additional aspheric surface being applied to the object-side surface thereof. Generally, a composite aspheric lens like the first lens of the second lens unit $G_2$ is more stable to a humidity change than a resin lens. In this example, the low-hygroscopicity resin is additionally used as the resin forming the resin layer of this composite aspheric lens.

Figure 3:
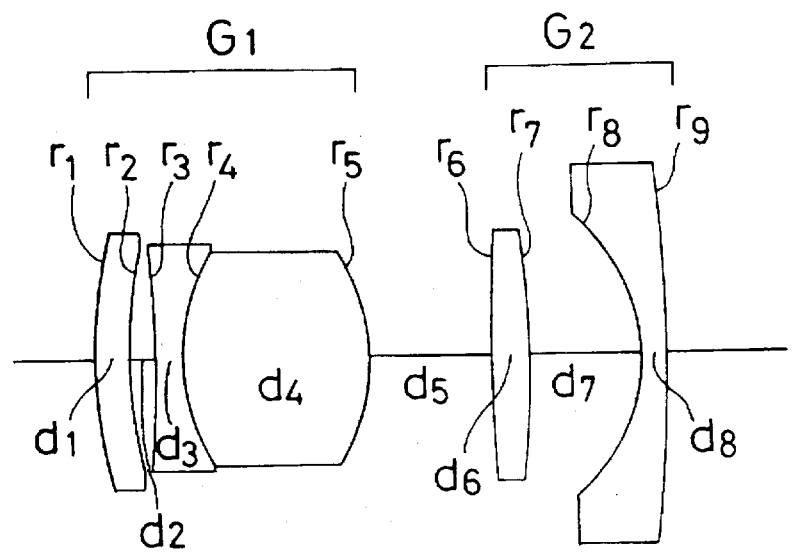
FIG. 3 is a sectional view at the wide-angle end of the zoom lens system according to Example 3.

In Example 3 the invention is applied to a zoom lens system having a focal length of 39 mm to 68 mm and an F-number of 4.65 to 7.98. A sectional view of Example 3 at the wide-angle end is shown in FIG. 3. The zoom lens arrangement consists of a first positive lens unit $G_1$ and a second negative lens unit $G_2$ in order from the object side. The first lens unit $G_1$ consists of, in order from the object side, a positive meniscus lens convex on the object side and a cemented doublet of a double-concave lens and a double-convex lens, three in all, while the second lens unit $G_2$ consists of a positive meniscus lens convex on the image side and a negative meniscus lens convex on the image side. Aspheric surfaces are applied to the image-side $r_2$ surface of the first lens of the first lens unit $G_1$ and the object-side surface of the first lens of the second lens unit $G_2$. These aspheric lenses are then formed of a polyolefin type resin that is of low hygroscopicity.

Figure 4:
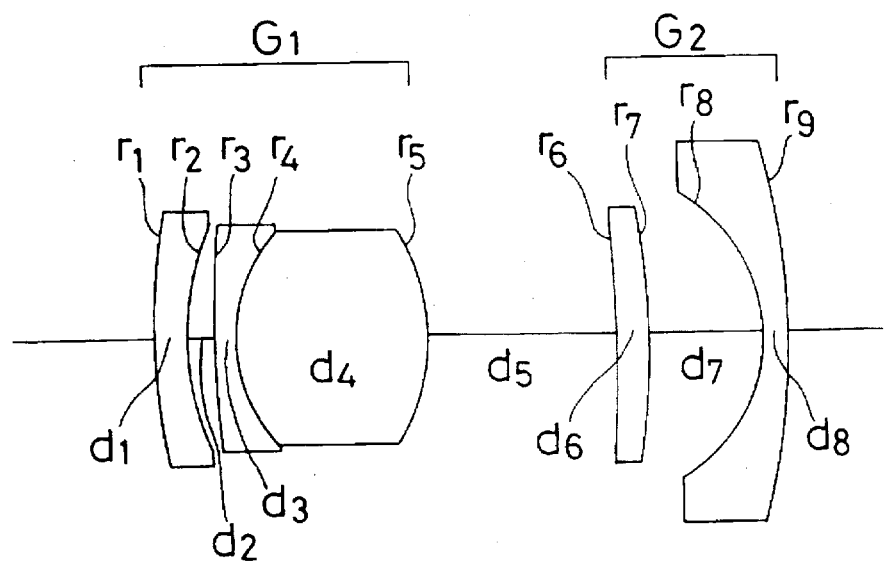
FIG. 4 is a sectional view at the wide-angle end of the zoom lens system according to Example 4.
Figure 5:
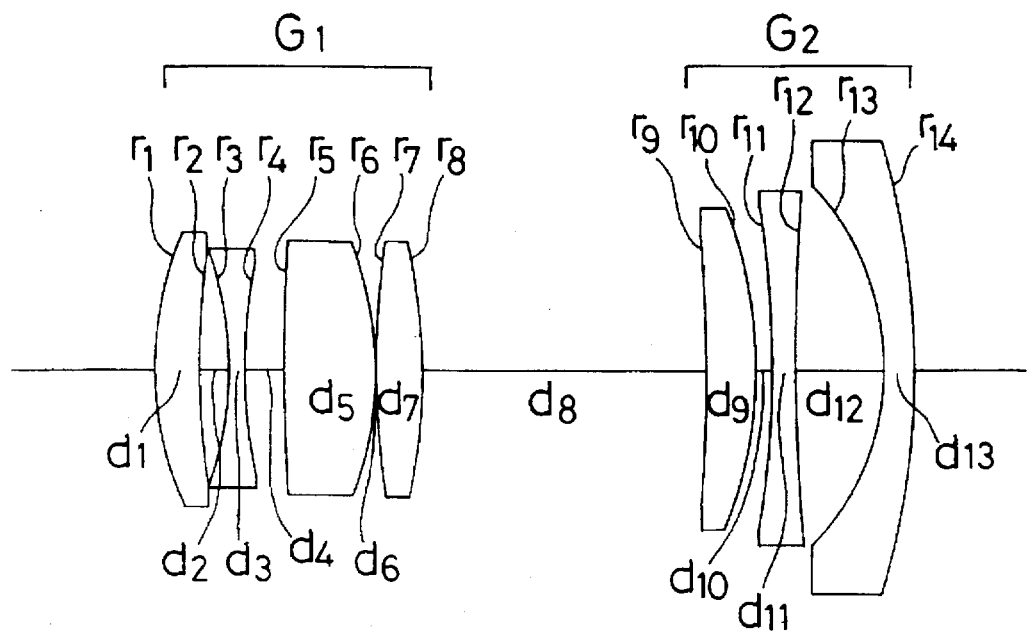
FIG. 5 is a sectional view at the wide-angle end of the zoom lens system according to Example 5.

In Example 4 the invention is applied to a zoom lens system having a focal length of 39 mm to 68 mm and an F-number of 4.65 to 7.98. A sectional view of the zoom lens system at the wide-angle end is shown in FIG. 4. The zoom lens arrangement consists of a first positive lens unit $G_1$ and a second negative lens unit $G_2$ in order from the object side. The first lens unit $G_1$ consists of a negative meniscus lens convex on the object side and a cemented doublet of a negative meniscus lens convex on the object side and a double-convex lens, three in all, while the second lens unit $G_2$ consists of a positive meniscus lens convex on the image side and a negative meniscus lens convex on the image side, two in all. Aspheric surfaces are applied to the image-side surface of the first lens of the first lens unit $G_1$ and the object-side surface of the first lens of the second lens unit $G_2$. The first lens of the first lens unit $G_1$ is then formed of a polyolefin type resin that is a resin of low hygroscopicity, while the first lens of the second lens unit $G_2$ is formed of a methyl polymethacrylate type of low-hygroscopicity acrylic resin which is improved in terms of humidity characteristics.

In Example 5 the invention is applied to a zoom lens system having a focal length of 39 mm to 77 mm and an F-number of 4.64 to 6.62. A sectional view of the zoom lens system at the wide-angle end shown in FIG. 5. The zoom lens arrangement consists of a first positive lens unit $G_1$ and a second negative lens unit $G_2$ in order from the object side. The first lens unit $G_1$ consists of a positive meniscus lens convex on the object side, a double-concave lens, a double-convex lens and a double-convex lens, four in all, while the second lens unit $G_2$ consists of a positive meniscus lens convex on the image side, a double-concave lens and a negative meniscus lens convex on the image side, three in all. An aspheric surface is applied to the image-side surface of the fourth lens of the first lens unit $G_1$, and it is this lens that is formed of a polyolefin type resin that is a resin of low hygroscopicity.

Figure 6:
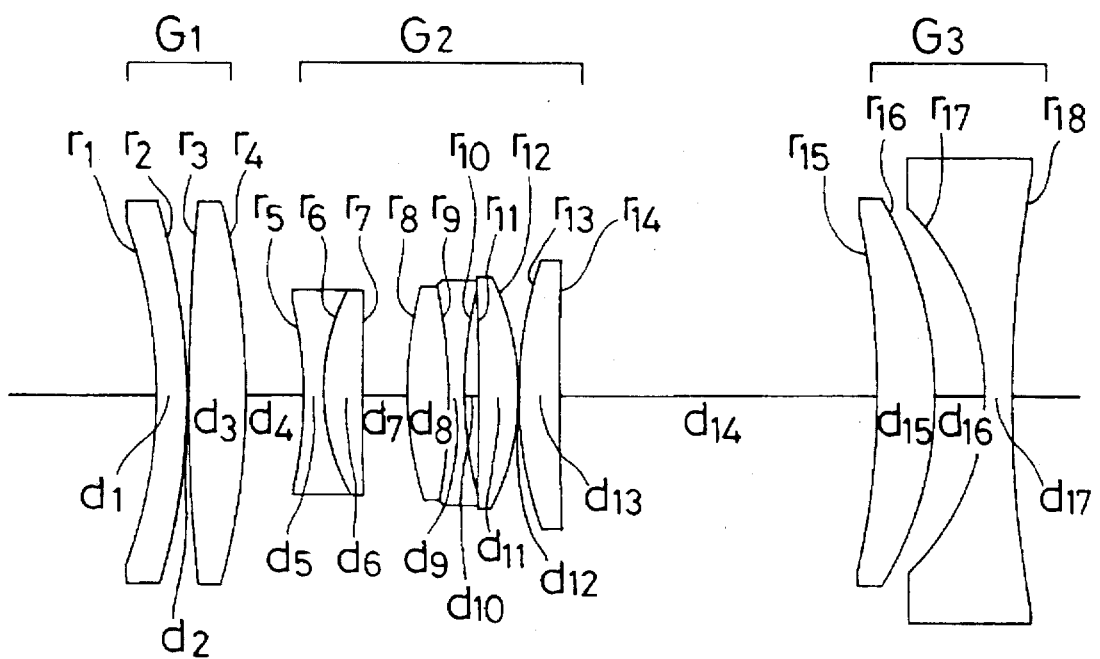
FIG. 6 is a sectional view at the wide-angle end of the zoom lens system according to Example 6.
Figure 9A:
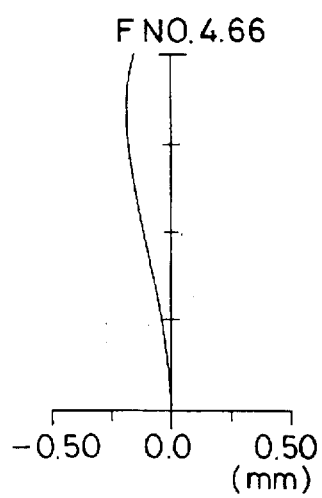
FIGS. 9(a) to 9(c) are aberration diagrams showing the spherical aberration in FIG. 9(a), astigmatism FIG. 9(b) and distortion FIG. 9(c) of Example 2 at the wide-angle end.
Figure 9B:
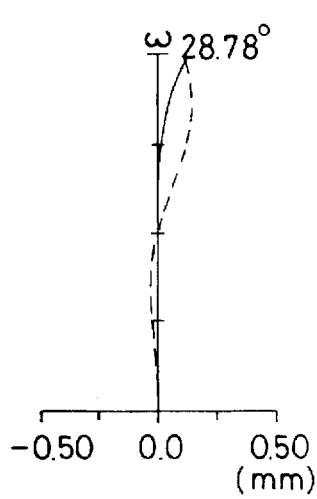
Figure 9C:
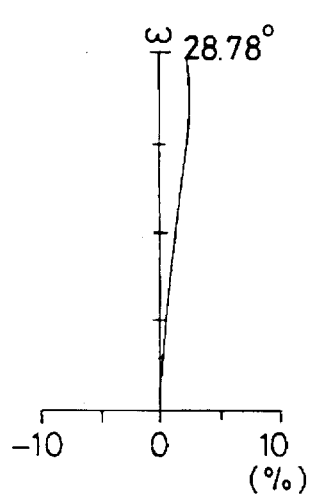
Figure 10A:
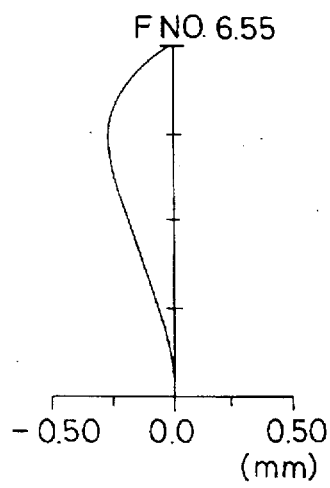
FIGS. 10(a) to 10(c) are aberration diagrams of Example 2 at an intermediate focal distance, which is similar to FIGS. 9(a) to 9(c), FIGS. 11(a) to 11(c) are aberration diagrams of Example 2 at the telephoto end, which is similar to FIGS. 9(a) to 9(c), FIGS. 12(a) to 12(c) are aberration diagrams of Example 3 at the wide-angle end, which is similar to FIGS. 9(a) to 9(c), FIGS. 13(a) to 13(c) are aberration diagrams of Example 3 at an intermediate focal distance, which is similar to FIGS. 9(a) to 9(c), FIGS. 14(a) to 14(c) are aberration diagrams of Example 3 at the telephoto end, which is similar to FIGS. 9(a) to 9(c), FIGS. 15(a) to 15(c) are aberration diagrams of Example 4 at the wide-angle end, which is similar to FIGS. 9(a) to 9(c), FIGS. 16(a) to 16(c) are aberration diagrams of Example 4 at an intermediate focal distance, which is similar to FIGS. 9(a) to 9(c), FIGS. 17(a) to 17(b) are aberration diagrams of Example 4 at the telephoto end, which is similar to FIGS. 9(a) to 9(c), FIGS. 18(a) to 18(b) are aberration diagrams of Example 5 at the wide-angle end, which is similar to FIGS. 9(a) to 9(c), FIGS. 19(a) to 19(c) are aberration diagram of Example 5 at an intermediate focal distance, which is similar to FIGS. 9(a) to 9(c), FIGS. 20(a) to 20(c) are aberration diagrams of Example 5 at the telephoto end, which is similar to FIGS. 9(a) to 9(c), FIGS. 21(a) to 21(c) are aberration diagrams of Example 6 at the wide-angle end, which is similar to FIGS. 9(a) to 9(c), FIGS. 22(a) to 22(c) are aberration diagrams of Example 6 at an intermediate focal distance, which is similar to FIGS. 9(a) to 9(c), FIGS. 23(a) to 23(c) are aberration diagrams of Example 6 at the telephoto end, which is similar to FIGS. 9(a) to 9(c), FIGS. 24(a) to 24(c) are aberration diagrams of Example 7 at the wide-angle end, which is similar to FIGS. 9(a) to 9(c), FIGS. 25(a) to 25(c) are aberration diagrams of Example 7 at an intermediate focal distance, which is similar to FIGS. 9(a) to 9(c), FIGS. 26(a) to 26(c) are aberration diagrams of Example 7 at the telephoto end, which is similar to FIGS. 9(a) to 9(c)
Figure 10B:
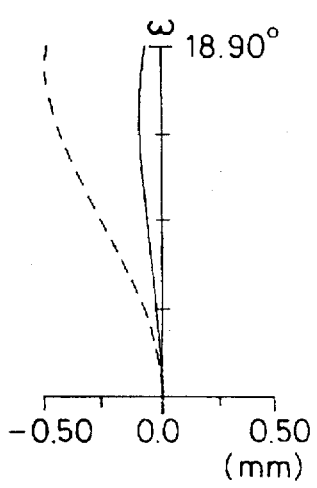
Figure 10C:
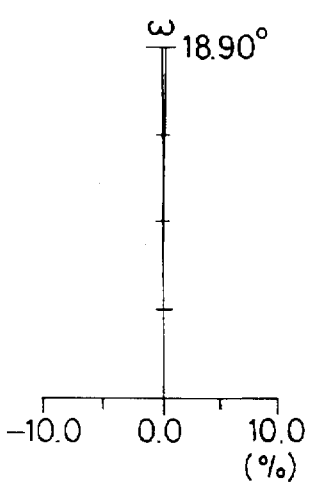
Figure 11A:
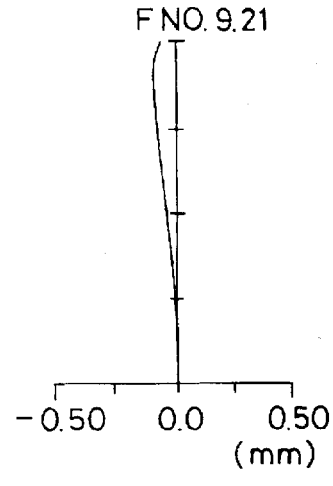
Figure 11B:
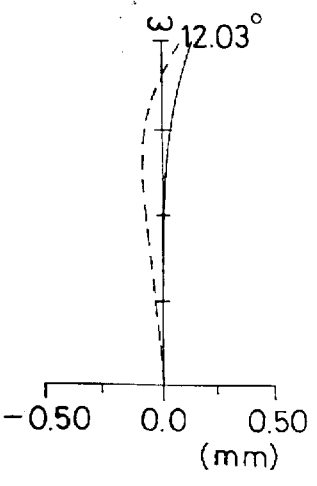
Figure 11C:
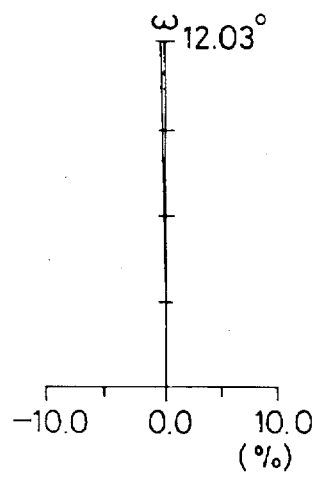
Figure 12A:
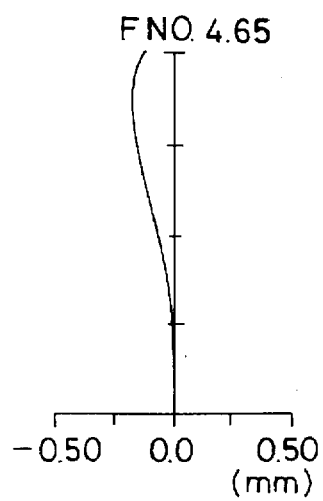
Figure 12B:
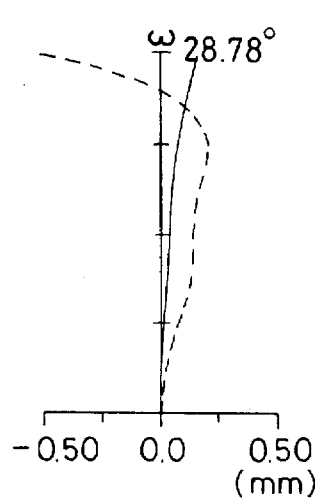
Figure 12C:
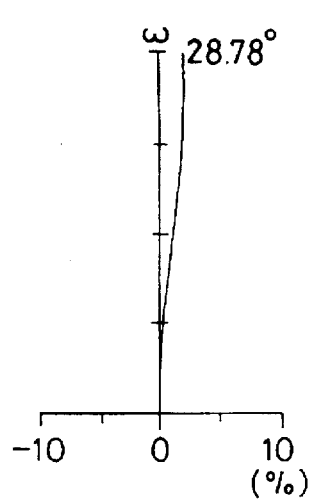
Figure 13A:
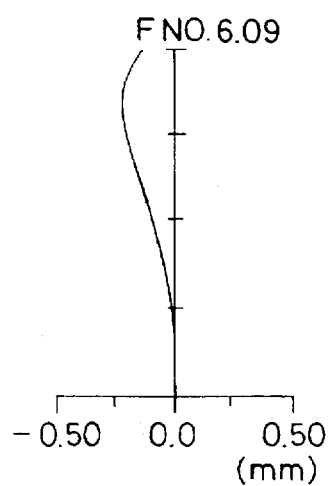
Figure 13B:
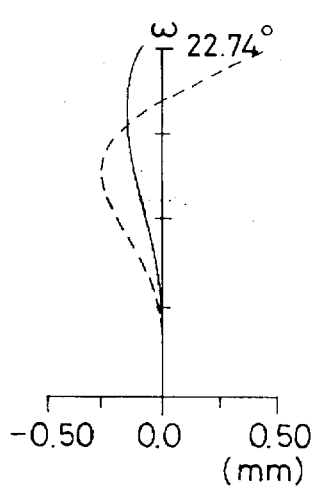
Figure 13C:
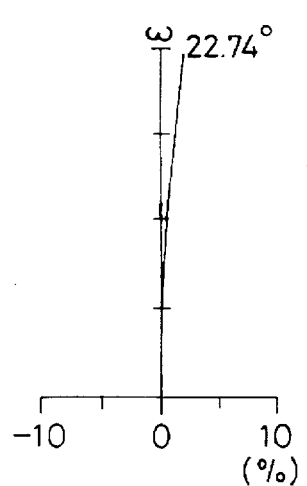
Figure 14A:
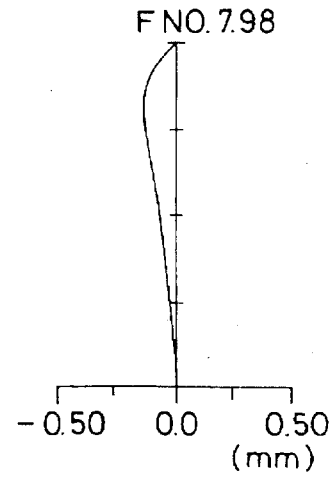
Figure 14B:
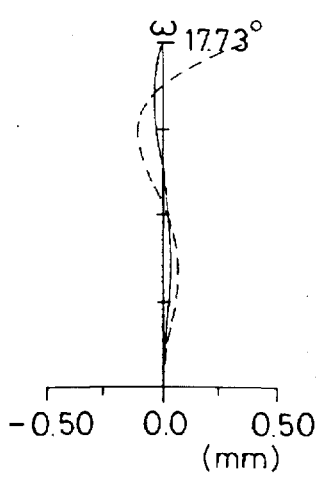
Figure 14C:
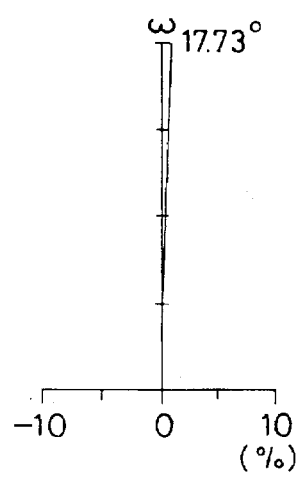
Figure 15A:
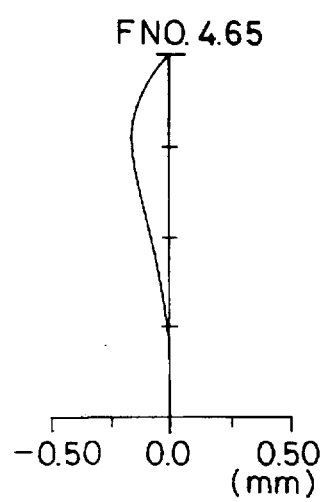
Figure 15B:
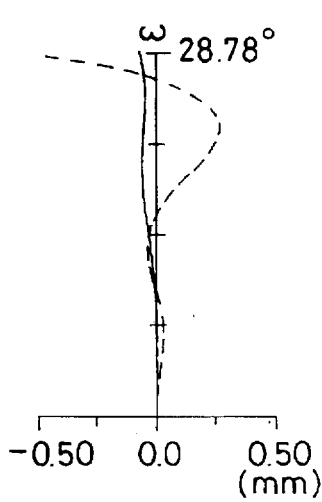
Figure 15C:
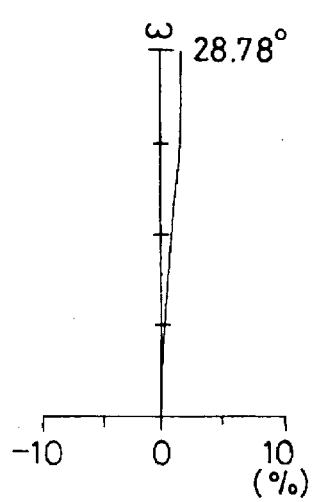
Figure 16A:
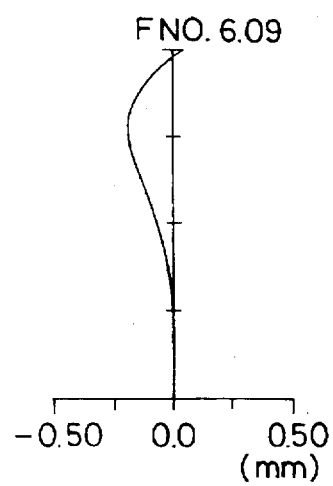
Figure 16B:
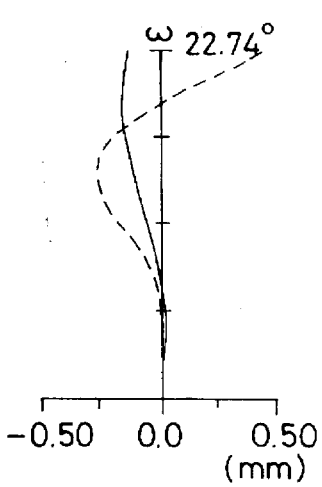
Figure 16C:
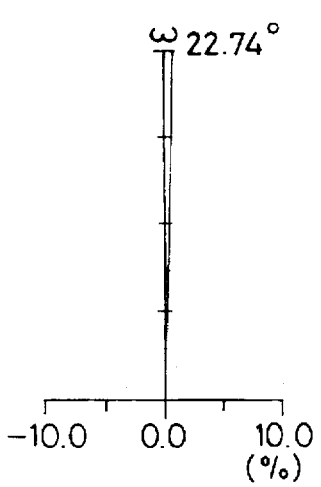
Figure 17A:
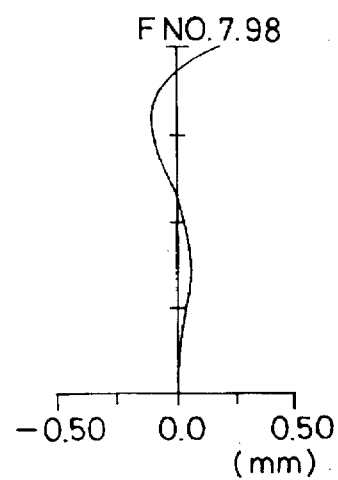
Figure 17B:
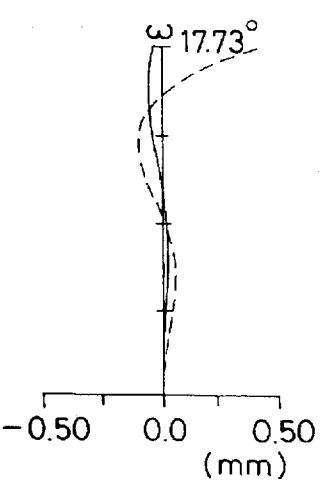
Figure 17C:
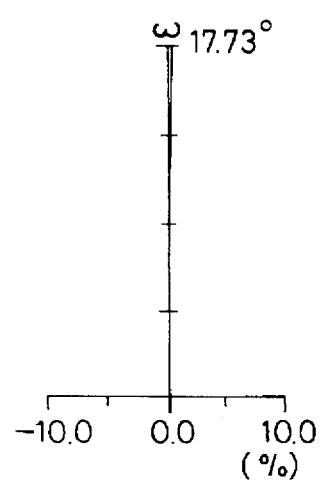
Figure 18A:
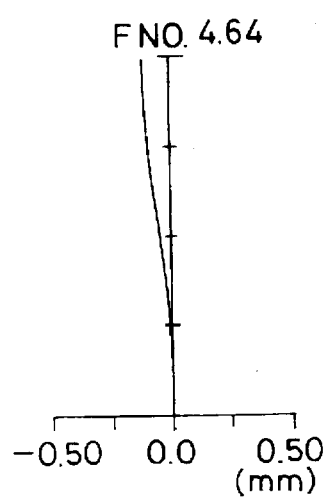
Figure 18B:
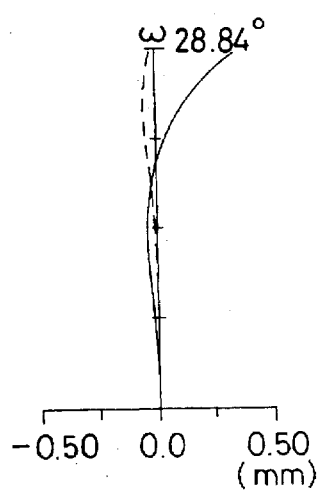
Figure 18C:
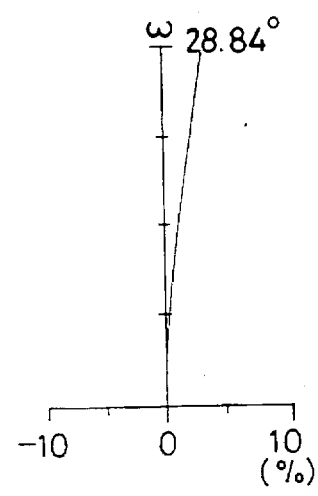
Figure 19A:
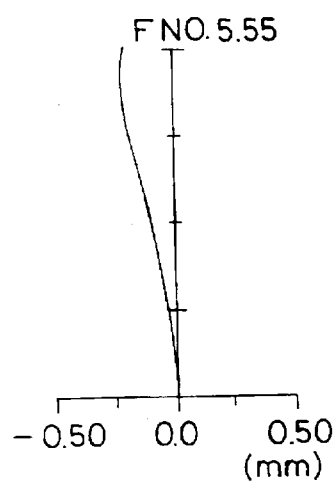
Figure 19B:
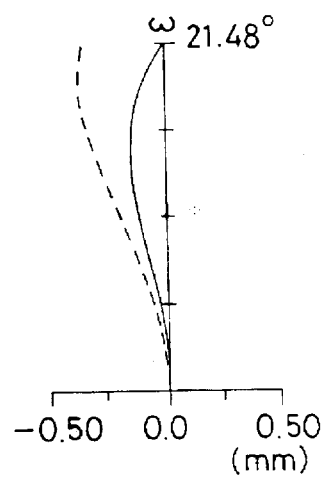
Figure 19C:
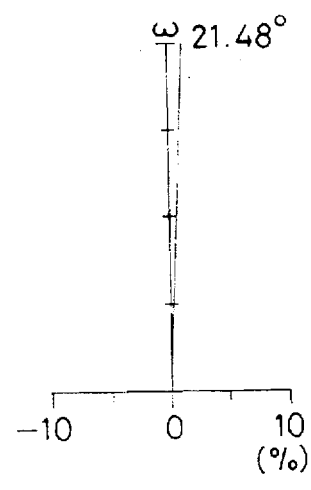
Figure 20A:
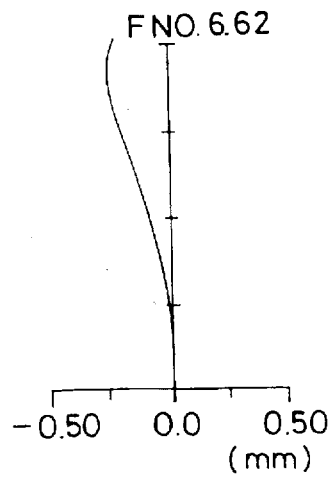
Figure 20B:
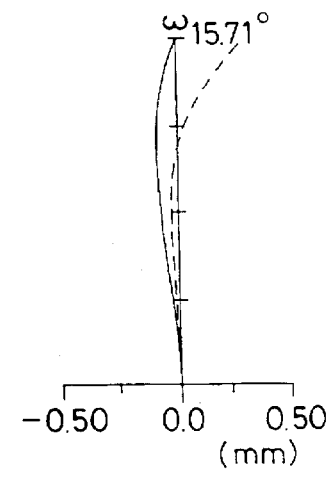
Figure 20C:
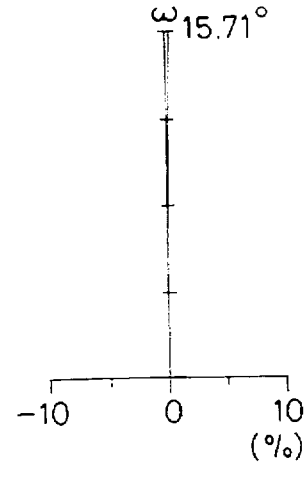
Figure 21A:
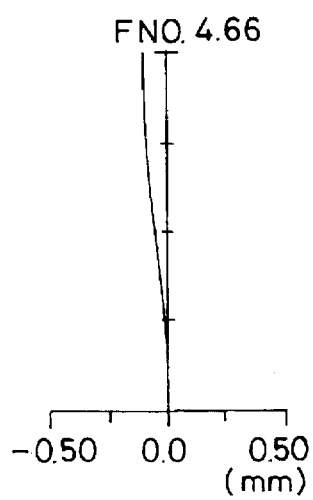
Figure 21B:
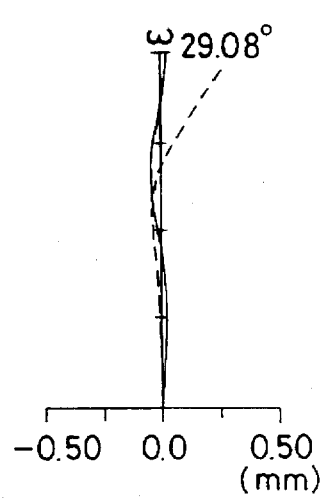
Figure 21C:
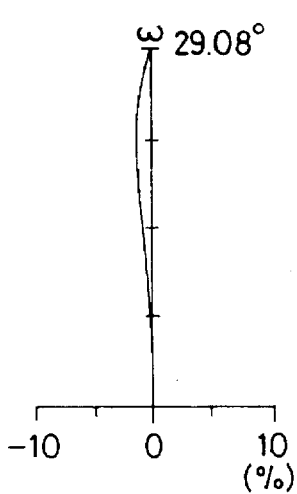
Figure 22A:
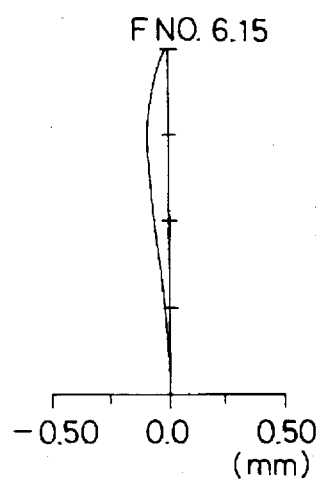
Figure 22B:
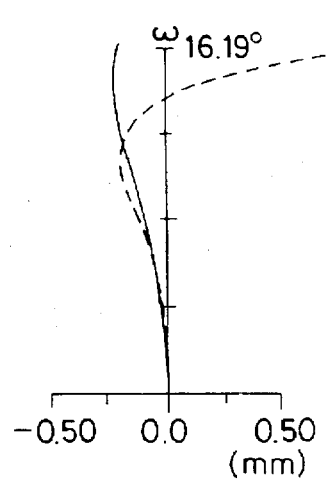
Figure 22C:
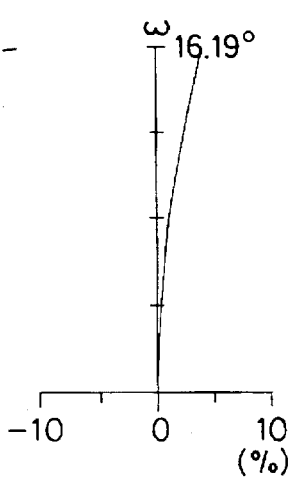
Figure 23A:
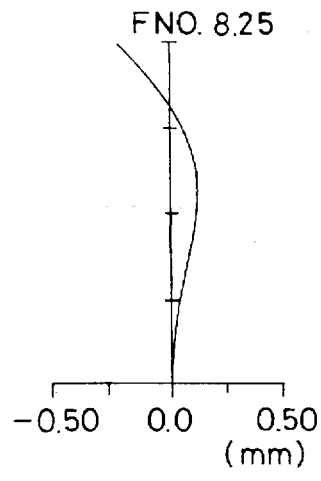
Figure 23B:
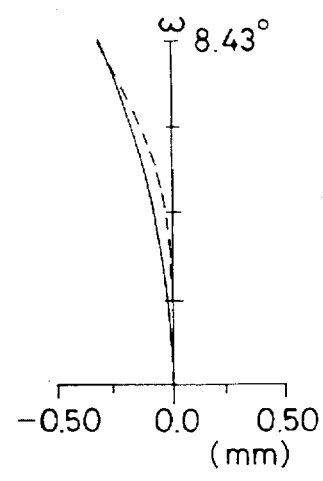
Figure 23C:
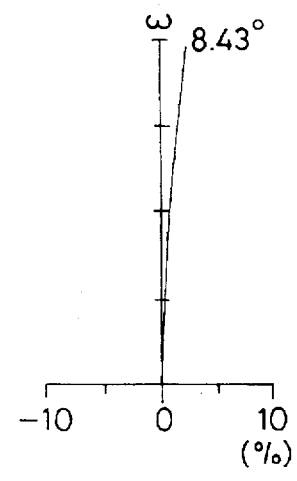

In Example 6 the invention is applied to a zoom lens system having a focal length of 39 mm to 146 mm and an F-number of 4.66 to 8.25. A sectional view of the zoom lens system at the wide-angle end is shown in FIG. 6. The zoom lens arrangement consists of a first positive lens unit $G_1$, a second positive lens unit $G_2$ and a third negative lens unit $G_3$ in order from the object side. The first lens unit $G_1$ consists of a negative meniscus lens concave on the object side and a double-convex lens, two in all; the second lens unit $G_2$ consists of a cemented doublet of a double-concave lens and a positive meniscus lens convex on the object side, a cemented doublet of a double-convex lens and a double-concave lens, a positive meniscus lens convex on the image side and a positive meniscus lens convex on the object side, six in all; and the third lens unit $G_3$ consists of a positive meniscus lens convex on the image side and a double-concave lens, two in all. Aspheric surfaces are applied to the object-side surface of the first lens of the second lens unit $G_2$ and the image-side surface of the first lens of the third lens unit $G_3$. The final or sixth lens of the second lens unit $G_2$ is formed of a polyolefin type resin that is a low-hygroscopicity resin.

In Example 7 the invention is applied to a zoom lens system having a focal length of 39 mm to 146 mm and an F-number of 4.66 to 8.25. A sectional view of the zoom lens system at the wide-angle end is shown in FIG. 7. The zoom lens arrangement consists of, in order from the object side, a first positive lens unit $G_1$, a second negative lens unit $G_2$, a third positive lens unit $G_3$ and a fourth negative lens unit $G_4$. The first lens unit $G_1$ consists of a negative meniscus lens concave on the object side and a double-convex lens, two in all; the second lens unit $G_2$ consists of a cemented doublet of a double-concave lens and a positive meniscus lens convex on the object side, two in all; the third lens unit $G_3$ consists of a cemented doublet of a double-convex lens and a double-concave lens, a positive meniscus lens convex on the image side and a positive meniscus lens convex on the object side, four in all; and the fourth lens unit $G_4$ consists of a positive meniscus lens convex on the image side and a double-concave lens, two in all. Aspheric surfaces are applied to the object-side surface of the first lens of the second lens unit $G_2$ and the image-side surface of the first lens of the fourth lens unit $G_4$. In this example the final or fourth lens of the third lens unit $G_3$ is formed of a polyolefin type resin that is a low-hygroscopicity resin.

While the examples above mentioned have been described mainly with reference to the polyolefin type resin, it is to be understood that optical properties stable to a humidity change are achievable even when a methyl polymethacrylate type of low-hygroscopicity acrylic resin is used instead. The polyolefin type resin used in each example is found to have a rate of change of virtually 0% under conditions of a temperature of 60° C. and a humidity of 95% RH, while the methyl polymethacrylate type of low-hygroscopicity acrylic resin is found to have a rate of change of substantially 0.2% under such conditions as mentioned above.

Enumerated below are numerical data on each example. The symbols used hereinafter have the following meanings.

f ... the focal length of the overall system
$F_{NO}$ ... F-number
$2\omega$ ... the angle of view
$r_1, r_2, \ldots$ the radius of curvature of each lens surface
$d_1, d_2, \ldots$ the spacing between adjacent lens surfaces
$n_{d1}, n_{d2}, \ldots$ the d-line index of refraction of each lens
$\nu_{d1}, \nu_{d2}, \ldots$ the Abbe's number of each lens Here let x represent the direction of propagation of light on the optical axis and y stand for the direction perpendicular to the optical axis. Aspheric shape is then given by:

$$x = (y^2/r)/[1+\{1-P(y/r)^2\}^{1/2}] + A_4 y^4 + A_6 y^6 + A_8 y^8 + A_{10} y^{10}$$

where r is the paraxial radius of curvature, P is the conical coefficient, and each of $A_4$, $A_6$, $A_8$ and $A_{10}$ is the aspherical coefficient.

Example 1
f = 34.25 mm
$F_{NO}$ = 2.89
$2\omega$ = 64.48°

| | | |
|---|---|---|
| $r_1$ = 11.1879 | $d_1$ = 2.680 | $n_{d1}$ = 1.729157  $\nu_{d1}$ = 54.68 |
| $r_2$ = 34.1203 | $d_2$ = 0.950 | |
| $r_3$ = −60.5922 | $d_3$ = 1.000 | $n_{d2}$ = 1.761821  $\nu_{d2}$ = 26.52 |
| $r_4$ = 25.7455 | $d_4$ = 2.570 | |
| $r_5$ = 26.3702 | $d_5$ = 5.570 | $n_{d3}$ = 1.623740  $\nu_{d3}$ = 47.10 |
| $r_6$ = −28.5578 | $d_6$ = 5.779 | |
| $r_7$ = −7.2886 | $d_7$ = 1.171 | $n_{d4}$ = 1.525420  $\nu_{d4}$ = 55.78 |
| $r_8$ = −14.0439 (Aspheric) | | |

Aspherical Coefficients
8th surface

P = 1.00000
$A_4$ = 0.703295 × 10⁻⁵
$A_6$ = −0.681065 × 10⁻⁶
$A_8$ = 0.566708 × 10⁻⁸
$A_{10}$ = −0.613671 × 10⁻¹⁰

Example 2
f = 39.32 ~ 63.10 ~ 101.34 mm
$F_{NO}$ = 4.66 ~ 6.55 ~ 9.21
$2\omega$ = 57.56 ~ 37.80 ~ 24.06°

| | | |
|---|---|---|
| $r_1$ = 17.9850 (Aspheric) | $d_1$ = 2.000 | $n_{d1}$ = 1.525420  $\nu_{d1}$ = 55.78 |
| $r_2$ = 12.5295 | $d_2$ = 7.181 | |
| $r_3$ = 49.6819 | $d_3$ = 1.500 | $n_{d2}$ = 1.739998  $\nu_{d2}$ = 28.29 |
| $r_4$ = 17.2812 | $d_4$ = 8.636 | $n_{d3}$ = 1.571351  $\nu_{d3}$ = 52.92 |
| $r_5$ = −15.4180 | $d_5$ = (Variable) | |
| $r_6$ = −39.7865 (Aspheric) | $d_6$ = 0.050 | $n_{d4}$ = 1.522880  $\nu_{d4}$ = 52.50 |
| $r_7$ = −80.0040 | $d_7$ = 3.500 | $n_{d5}$ = 1.575006  $\nu_{d5}$ = 41.49 |
| $r_8$ = −27.3153 | $d_8$ = 5.605 | |
| $r_9$ = −11.7760 | $d_9$ = 1.600 | $n_{d6}$ = 1.740999  $\nu_{d6}$ = 52.65 |
| $r_{10}$ = −40.0269 | | |

Zooming Spaces

| f | 39.32 | 63.10 | 101.34 |
|---|---|---|---|
| $d_5$ | 16.823 | 8.742 | 3.700 |

Aspherical Coefficients
1st surface

P = 1.00000
$A_4$ = −0.519100 × 10⁻⁴
$A_6$ = −0.360400 × 10⁻⁶
$A_8$ = −0.167440 × 10⁻⁸
$A_{10}$ = 0.245960 × 10⁻¹³

6th surface

P = 1.00000
$A_4$ = 0.458160 × 10⁻⁴
$A_6$ = 0.176510 × 10⁻⁶
$A_8$ = 0.124010 × 10⁻⁸
$A_{10}$ = −0.472940 × 10⁻¹²

Example 3
f = 39.33 ~ 51.54 ~ 67.55 mm
$F_{NO}$ = 4.65 ~ 6.09 ~ 7.98
$2\omega$ = 57.56 ~ 45.48 ~ 35.46°

| | | |
|---|---|---|
| $r_1$ = 30.8562 | $d_1$ = 2.000 | $n_{d1}$ = 1.525420  $\nu_{d1}$ = 55.78 |
| $r_2$ = 49.5774 (Aspheric) | $d_2$ = 1.500 | |

-continued

| | | |
|---|---|---|
| $r_3 = -128.1934$ | $d_3 = 1.450$ | $n_{d2} = 1.605620 \ \nu_{d2} = 43.72$ |
| $r_4 = 11.2190$ | $d_4 = 11.480$ | $n_{d3} = 1.516330 \ \nu_{d3} = 64.15$ |
| $r_5 = -13.1250$ | $d_5 = $ (Variable) | |
| $r_6 = -326.3644$ (Aspheric) | $d_6 = 2.000$ | $n_{d4} = 1.525420 \ \nu_{d4} = 55.78$ |
| $r_7 = -67.7636$ | $d_7 = 6.760$ | |
| $r_8 = -11.2906$ | $d_8 = 1.500$ | $n_{d5} = 1.516330 \ \nu_{d5} = 64.15$ |
| $r_9 = -122.4235$ | | |

Zooming Spaces

| f | 39.33 | 51.54 | 67.55 |
|---|---|---|---|
| $d_5$ | 12.603 | 7.334 | 3.311 |

Aspherical Coefficients
2nd surface $P = 45.760992$
$A_4 = 0.592330 \times 10^{-4}$
$A_6 = -0.597725 \times 10^{-6}$
$A_8 = 0.325751 \times 10^{-7}$
$A_{10} = -0.490799 \times 10^{-9}$ 6th surface $P = -13966.5713069$
$A_4 = 0.264580 \times 10^{-5}$
$A_6 = 0.138296 \times 10^{-5}$
$A_8 = -0.181813 \times 10^{-7}$
$A_{10} = 0.109335 \times 10^{-9}$

Example 4
$f = 39.33 \sim 51.54 \sim 67.55$ mm
$F_{NO} = 4.65 \sim 6.09 \sim 7.98$
$2\omega = 57.56 \sim 45.48 \sim 35.46°$

| | | |
|---|---|---|
| $r_1 = 48.8475$ | $d_1 = 2.000$ | $n_{d1} = 1.525420 \ \nu_{d1} = 55.78$ |
| $r_2 = 32.0461$ (Aspheric) | $d_2 = 1.500$ | |
| $r_3 = 79.3507$ | $d_3 = 1.450$ | $n_{d2} = 1.605620 \ \nu_{d2} = 43.72$ |
| $r_4 = 9.9483$ | $d_4 = 11.480$ | $n_{d3} = 1.516330 \ \nu_{d3} = 64.15$ |
| $r_5 = -12.1817$ | $d_5 = $ (Variable) | |
| $r_6 = -66.9274$ (Aspheric) | $d_6 = 2.000$ | $n_{d4} = 1.492410 \ \nu_{d4} = 57.66$ |
| $r_7 = -49.6773$ | $d_7 = 6.760$ | |
| $r_8 = -9.9388$ | $d_8 = 1.500$ | $n_{d5} = 1.516330 \ \nu_{d5} = 64.15$ |
| $r_9 = -43.5202$ | | |

Zooming Spaces

| f | 39.33 | 51.54 | 67.55 |
|---|---|---|---|
| $d_5$ | 11.049 | 6.651 | 3.293 |

Aspherical Coefficients
2nd surface $P = 20.260857$
$A_4 = 0.607288 \times 10^{-4}$
$A_6 = -0.786176 \times 10^{-6}$
$A_8 = 0.470124 \times 10^{-7}$
$A_{10} = -0.883415 \times 10^{-9}$ 6th surface $P = -51.709184$
$A_4 = 0.421345 \times 10^{-4}$
$A_6 = 0.406479 \times 10^{-6}$
$A_8 = 0.408721 \times 10^{-8}$
$A_{10} = 0.546995 \times 10^{-10}$

Example 5
$f = 39.23 \sim 54.89 \sim 76.77$ mm
$F_{NO} = 4.64 \sim 5.55 \sim 6.62$
$2\omega = 57.68 \sim 42.96 \sim 31.42°$

| | | |
|---|---|---|
| $r_1 = 18.8827$ | $d_1 = 2.600$ | $n_{d1} = 1.712995 \ \nu_{d1} = 53.84$ |
| $r_2 = 73.1426$ | $d_2 = 1.500$ | |
| $r_3 = -22.9152$ | $d_3 = 1.020$ | $n_{d2} = 1.834000 \ \nu_{d2} = 37.16$ |
| $r_4 = 33.7761$ | $d_4 = 2.150$ | |
| $r_5 = 152.7442$ | $d_5 = 5.300$ | $n_{d3} = 1.583126 \ \nu_{d3} = 59.36$ |
| $r_6 = -19.4743$ | $d_6 = 0.150$ | |
| $r_7 = 64.1264$ | $d_7 = 2.610$ | $n_{d4} = 1.525420 \ \nu_{d4} = 55.78$ |
| $r_8 = -34.7668$ (Aspheric) | $d_8 = $ (Variable) | |
| $r_9 = -354.7373$ | $d_9 = 3.100$ | $n_{d5} = 1.531717 \ \nu_{d5} = 48.90$ |
| $r_{10} = -22.9722$ | $d_{10} = 0.900$ | |

-continued

| | | |
|---|---|---|
| $r_{11} = -49.5803$ | $d_{11} = 1.260$ | $n_{d6} = 1.772499$ $\nu_{d6} = 49.66$ |
| $r_{12} = 130.0028$ | $d_{12} = 5.000$ | |
| $r_{13} = -14.6559$ | $d_{13} = 1.620$ | $n_{d7} = 1.729157$ $\nu_{d7} = 54.68$ |
| $r_{14} = -46.2180$ | | |

Zooming Spaces

| f | 39.23 | 54.89 | 76.77 |
|---|---|---|---|
| $d_8$ | 16.063 | 8.906 | 3.796 |

Aspherical Coefficients
8th surface $P = 1.00000$
$A_4 = 0.419995 \times 10^{-5}$
$A_6 = -0.282002 \times 10^{-7}$
$A_8 = 0.325083 \times 10^{-9}$
$A_{10} = 0$ Example 6
f = 38.84 ~ 74.38 ~ 145.73 mm
$F_{NO}$ = 4.66 ~ 6.15 ~ 8.25
2ω = 58.16 ~ 32.38 ~ 16.86°

| | | |
|---|---|---|
| $r_1 = -38.1083$ | $d_1 = 2.000$ | $n_{d1} = 1.846660$ $\nu_{d1} = 23.78$ |
| $r_2 = -53.0255$ | $d_2 = 0.200$ | |
| $r_3 = 127.8801$ | $d_3 = 3.791$ | $n_{d2} = 1.547710$ $\nu_{d2} = 62.83$ |
| $r_4 = -57.8439$ | $d_4 =$ (Variable) | |
| $r_5 = -29.1990$ (Aspheric) | $d_5 = 1.200$ | $n_{d3} = 1.696797$ $\nu_{d3} = 55.52$ |
| $r_6 = 15.2142$ | $d_6 = 2.823$ | $n_{d4} = 1.755502$ $\nu_{d4} = 25.07$ |
| $r_7 = 134.5227$ | $d_7 = 3.035$ | |
| $r_8 = 24.6491$ | $d_8 = 3.146$ | $n_{d5} = 1.487490$ $\nu_{d5} = 70.20$ |
| $r_9 = -37.2112$ | $d_9 = 1.200$ | $n_{d6} = 1.846660$ $\nu_{d6} = 23.78$ |
| $r_{10} = 38.6220$ | $d_{10} = 0.738$ | |
| $r_{11} = -389.1359$ | $d_{11} = 2.984$ | $n_{d7} = 1.638539$ $\nu_{d7} = 55.38$ |
| $r_{12} = -16.7335$ | $d_{12} = 0.200$ | |
| $r_{13} = 29.0707$ | $d_{13} = 2.697$ | $n_{d8} = 1.525420$ $\nu_{d8} = 55.78$ |
| $r_{14} = 294.8227$ | $d_{14} =$ (Variable) | |
| $r_{15} = -69.4417$ | $d_{15} = 4.100$ | $n_{d9} = 1.784702$ $\nu_{d9} = 26.22$ |
| $r_{16} = -27.7015$ (Aspheric) | $d_{16} = 3.404$ | |
| $r_{17} = -18.1374$ | $d_{17} = 2.000$ | $n_{d10} = 1.786500$ $\nu_{d10} = 50.00$ |
| $r_{18} = 107.8747$ | | |

Zooming Spaces

| f | 38.84 | 74.38 | 145.73 |
|---|---|---|---|
| $d_4$ | 4.321 | 29.658 | 42.839 |
| $d_{14}$ | 22.448 | 10.657 | 1.971 |

Aspherical Coefficients
5th surface $P = 1.00000$
$A_4 = 0.293445 \times 10^{-4}$
$A_6 = -0.150253 \times 10^{-6}$
$A_8 = 0.192682 \times 10^{-9}$
$A_{10} = -0.160987 \times 10^{-10}$ 16th surface $P = 1.00000$
$A_4 = -0.946178 \times 10^{-5}$
$A_6 = -0.454434 \times 10^{-7}$
$A_8 = 0.236569 \times 10^{-9}$
$A_{10} = -0.610403 \times 10^{-12}$ Example 7
f = 38.85 ~ 73.92 ~ 145.29 mm
$F_{NO}$ = 4.66 ~ 6.15 ~ 8.25
2ω = 58.14 ~ 32.58 ~ 16.92°

| | | |
|---|---|---|
| $r_1 = -51.2344$ | $d_1 = 2.000$ | $n_{d1} = 1.846660$ $\nu_{d1} = 23.78$ |
| $r_2 = -78.6058$ | $d_2 = 0.200$ | |
| $r_3 = 71.4800$ | $d_3 = 3.791$ | $n_{d2} = 1.547710$ $\nu_{d2} = 62.83$ |
| $r_4 = -89.2353$ | $d_4 =$ (Variable) | |
| $r_5 = -27.6073$ (Aspheric) | $d_5 = 1.200$ | $n_{d3} = 1.696797$ $\nu_{d3} = 55.52$ |
| $r_6 = 15.4225$ | $d_6 = 2.823$ | $n_{d4} = 1.755502$ $\nu_{d4} = 25.07$ |
| $r_7 = 753.1154$ | $d_7 =$ (Variable) | |
| $r_8 = 21.9395$ | $d_8 = 3.146$ | $n_{d5} = 1.487490$ $\nu_{d5} = 70.20$ |
| $r_9 = -35.4440$ | $d_9 = 1.200$ | $n_{d6} = 1.846660$ $\nu_{d6} = 23.78$ |
| $r_{10} = 31.8471$ | $d_{10} = 1.210$ | |

-continued

| | | | |
|---|---|---|---|
| $r_{11} = -32364.8274$ | | $d_{11} = 3.243$ | $n_{d7} = 1.638539$ $\nu_{d7} = 55.38$ |
| $r_{12} = -17.5916$ | | $d_{12} = 0.200$ | |
| $r_{13} = 31.7344$ | | $d_{13} = 3.687$ | $n_{d8} = 1.525420$ $\nu_{d8} = 55.78$ |
| $r_{14} = -1565.9432$ | | $d_{14} = $ (Variable) | |
| $r_{15} = -53.9331$ | | $d_{15} = 4.100$ | $n_{d9} = 1.784702$ $\nu_{d9} = 26.22$ |
| $r_{16} = -25.9117$ (Aspheric) | | $d_{16} = 3.404$ | |
| $r_{17} = -18.1342$ | | $d_{17} = 2.000$ | $n_{d10} = 1.786500$ $\nu_{d10} = 50.00$ |
| $r_{18} = 107.8747$ | | | |

Zooming Spaces

| | | | |
|---|---|---|---|
| f | 38.85 | 73.92 | 145.29 |
| $d_4$ | 4.321 | 27.233 | 40.868 |
| $d_7$ | 2.521 | 1.731 | 0.912 |
| $d_{14}$ | 21.254 | 10.269 | 1.971 |

Aspherical Coefficients
5th surface $P = 1.00000$
$A_4 = -0.222615 \times 10^{-4}$
$A_6 = -0.131357 \times 10^{-6}$
$A_8 = 0.504914 \times 10^{-9}$
$A_{10} = -0.141649 \times 10^{-10}$ 16th surface $P = 1.00000$
$A_4 = -0.102453 \times 10^{-5}$
$A_6 = -0.372588 \times 10^{-7}$
$A_8 = 0.170304 \times 10^{-9}$
$A_{10} = -0.405411 \times 10^{-12}$ A aberration diagrams of Example 1 are shown in FIGS. 8(a) to 8(c) representing spherical aberration, astigmatism and distortion, respectively. FIGS. 9(a) to 11(c) are aberration diagrams representing the spherical aberration FIGS. 9(a), 10(a), 11(a) astigmatism FIGS. 9(b), 10(b), 11(b) and distortion FIGS. 9(c), 10(c), 11(c) of Example 2 at the wide-angle end, intermediate focal distance and telephoto end, respectively. FIGS. 12(a) to 14(c) are aberration diagrams of Example 3 corresponding to FIGS. 9(a) to 11(c). FIGS. 15(a) to 17(c) are aberration diagrams of Example 4 corresponding to FIGS. 9(a) to 11(c). FIGS. 18(a) to 20(c) are aberration diagrams of Example 5 corresponding to FIGS. 9(a) to 11(c). FIGS. 21(a) to 23(c) are aberration diagrams of Example 6 corresponding to FIGS. 9(a) to 11(c). FIGS. 24(a) to 26(c) are aberration diagrams of Example 7 corresponding to FIGS. 9(a) to 11(c).

Figure 27:
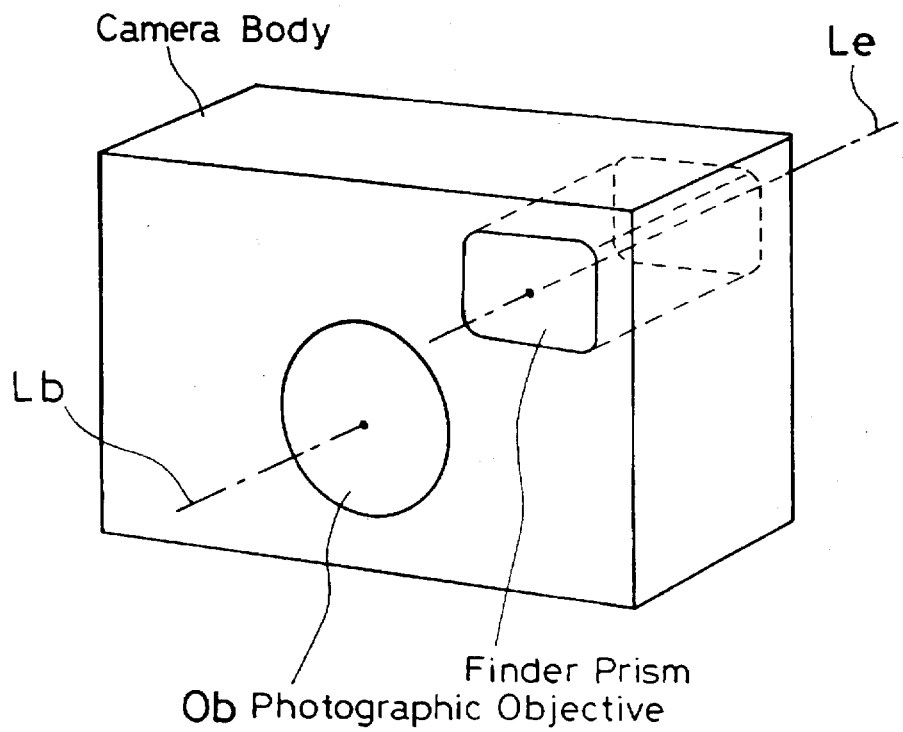
FIG. 27 is a perspective view of one example of the compact camera on which the photographic lens of the invention is mounted.
Figure 28:
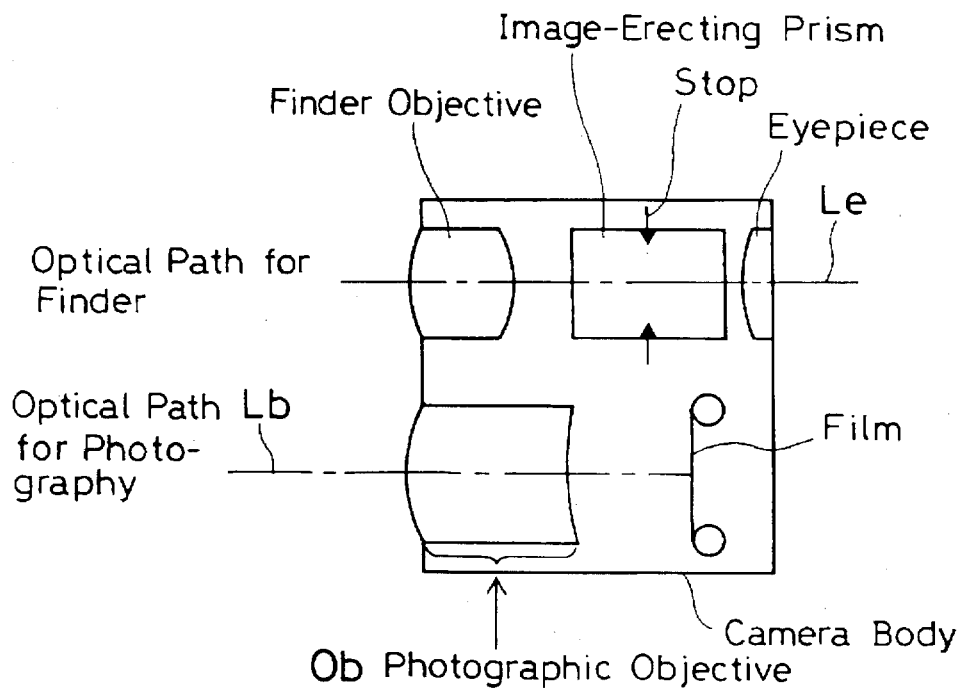
FIG. 28 is a sectional view of the compact camera of FIG. 27.

It is here to be understood that the photographic lens systems of the invention are all applicable to a photographic objective Ob for a compact camera, the construction of which is shown in perspective and section in FIGS. 27 and 28, respectively, in which Lb and Le are the photographic optical axis and finder optical axis, respectively. With the optical axes Lb and Le arranged in parallel with each other, the image of the subject is observed through a finder made up of a finder objective, an erecting prism, a stop and an eyepiece, and formed on film through the photographic objective Ob.

According to the invention as explained above, it is possible to achieve a photographic lens system for cameras which is stable to a humidity change, small and inexpensive.

What we claim is:

1. A varifocallength photographic lens system comprising:

a plurality of lens units, a separation between at least adjacent ones of said plurality of lens units being varied for zooming;

a final lens unit comprised of one of said plurality of lens units located nearest to an image side of said varifocallength photographic lens system, said final lens unit having a negative refracting power as a whole; and at least one low-hygroscopicity resin lens located in front of said final lens unit.

2. A photographic lens system comprising, in order from an object side:

a positive first lens unit;

a positive second lens unit including a low-hygroscopicity resin lens; and a negative third lens unit;

a separation between at least two of said positive first lens unit, said positive second lens unit, and said negative third lens unit being varied for zooming said photographic lens system.

3. A photographic lens system comprising, in order from an object side:

a positive first lens unit;

a negative second lens unit;

a positive third lens unit including a low-hygroscopicity resin lens; and a negative fourth lens unit;

a separation between at least two of said positive first lens unit, said negative second lens unit, said positive third lens unit, and said negative fourth lens unit being varied for zooming said photographic lens system.

4. The photographic lens system according to claim 1, wherein said plurality of lens comprise, in order from an object side:

a first positive lens unit; and ** a second negative lens unit.

5. The photographic lens system according to claim 1, wherein said plurality of lens units comprise, in order from an object side:

a first lens unit;

a second positive lens unit; and a third negative lens unit.

6. The photographic lens system according to claim 1, wherein said plurality of lens unit comprise, in order from an object side:

a first positive lens unit;

a second negative lens unit;

a third positive lens unit; and a fourth negative lens unit.

7. The photographic lens system according to claim 4, 5 or 6, wherein:

said at least one low-hygroscopicity resin lens is formed of a methyl polymethacrylate type of low-hygroscopicity acrylic resin.

8. The photographic lens system according to claim 4, 5 or 6, wherein:

said at least one low-hygroscopicity resin lens is formed of a polyolefin type resin.

9. The photographic lens system according to claim 2 or 3, wherein:

said low-hygroscopicity resin lens is formed of a methyl polymethacrylate type of low-hygroscopicity acrylic resin.

10. The photographic lens system according to claim 2 or 3, wherein:

said low-hygroscopicity resin lens is formed of a polyolefin type resin.

11. The photographic lens system according to claim 2 or 3, wherein:

said low-hygroscopicity resin lens includes an aspheric surface.

12. The photographic lens system according to claim 2 or 3, wherein:

said positive first lens unit includes an aspheric surface.

* * * * *